(12) United States Patent
Lee et al.

(10) Patent No.: US 12,117,073 B1
(45) Date of Patent: Oct. 15, 2024

(54) DIFFERENTIAL DISCONNECT SYSTEM

(71) Applicant: Schaeffler Technologies AG & Co. KG, Herzogenaurach (DE)

(72) Inventors: Brian Lee, Charlotte, NC (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/209,478

(22) Filed: Jun. 14, 2023

(51) Int. Cl.
| *F16H 48/08* | (2006.01) |
| *F16H 48/24* | (2006.01) |
| *F16H 48/34* | (2012.01) |
| *F16H 48/38* | (2012.01) |
| *F16H 48/40* | (2012.01) |

(52) U.S. Cl.
CPC ............ *F16H 48/08* (2013.01); *F16H 48/24* (2013.01); *F16H 2048/343* (2013.01); *F16H 2048/385* (2013.01); *F16H 2048/405* (2013.01)

(58) Field of Classification Search
CPC .... F16H 48/40–2048/405; F16H 48/42; F16H 48/34–2048/346; F16H 2048/305; F16H 48/24; F16H 48/08–11; F16H 2048/385
See application file for complete search history.

(56) References Cited

U.S. PATENT DOCUMENTS

| 2,069,411 | A * | 2/1937 | Keese ............... | B60K 17/16 74/447 |
| 6,015,361 | A * | 1/2000 | Yamazaki ........... | F16H 48/11 192/69.82 |
| 6,027,422 | A * | 2/2000 | Yamazaki ........... | B60K 23/04 192/53.36 |
| 6,299,562 | B1 * | 10/2001 | Kim .................. | B60K 23/08 475/221 |
| 7,892,134 | B2 * | 2/2011 | Fusegi ............... | F16H 48/30 475/235 |
| 8,221,278 | B2 * | 7/2012 | Biermann ........... | F16H 48/11 475/248 |
| 8,562,477 | B2 * | 10/2013 | Mizoguchi ......... | F16H 48/40 475/220 |
| 9,157,515 | B2 * | 10/2015 | Downs ............... | F16C 33/581 |
| 10,052,950 | B2 * | 8/2018 | Nett .................. | F16H 48/40 |
| 10,415,682 | B2 * | 9/2019 | Hirota ................ | F16H 48/40 |
| 11,231,098 | B2 * | 1/2022 | Swinger ............. | F16H 48/08 |
| 11,555,538 | B2 * | 1/2023 | Lee ................... | F16H 48/08 |
| 11,608,879 | B2 * | 3/2023 | Lee ................... | F16H 48/40 |

(Continued)

FOREIGN PATENT DOCUMENTS

WO    2022/217355 A1    10/2022

*Primary Examiner* — Stacey A Fluhart
*Assistant Examiner* — James J Taylor, II

(57) ABSTRACT

A differential disconnect system for a vehicle includes a housing arranged to receive a motor torque, a first clutch element, and a differential. The housing includes radially inwardly facing teeth and the first clutch element is drivingly engaged with and axially slidable on the radially inwardly facing teeth. The first clutch element includes a first face spline. The differential unit is arranged for driving engagement with a pair of axle shafts and includes a second clutch element with a second face spline arranged to engage the first face spline for selective torque transmission between the housing and the differential unit.

12 Claims, 6 Drawing Sheets

(56) References Cited

U.S. PATENT DOCUMENTS

| | | | |
|---|---|---|---|
| 11,686,380 B2* | 6/2023 | Cao | B60K 17/348 |
| | | | 475/160 |
| 11,828,355 B1* | 11/2023 | Yang | F16H 48/08 |
| 11,920,666 B2* | 3/2024 | DeLand | F16H 48/34 |
| 2017/0130815 A1* | 5/2017 | Wang | B60K 23/04 |
| 2020/0300348 A1* | 9/2020 | Koerschner | F16H 48/40 |
| 2023/0417310 A1* | 12/2023 | Verhoog | F16H 1/46 |

* cited by examiner

DIFFERENTIAL DISCONNECT SYSTEM

TECHNICAL FIELD

The present disclosure relates generally to a differential, and more specifically to a differential disconnect system.

BACKGROUND

Disconnect mechanisms in differentials are known. One example is shown and described in PCT Publication No. WO 2022/217355 titled DISCONNECTING DIFFERENTIAL SIDE GEAR MECHANISM to MAGNA POWERTRAIN, INC.

SUMMARY

Example embodiments broadly comprise a differential disconnect system for a vehicle including a housing arranged to receive a motor torque, a first clutch element, and a differential. The housing includes radially inwardly facing teeth and the first clutch element is drivingly engaged with and axially slidable on the radially inwardly facing teeth. The first clutch element includes a first face spline. The differential unit is arranged for driving engagement with a pair of axle shafts and includes a second clutch element with a second face spline arranged to engage the first face spline for selective torque transmission between the housing and the differential unit.

In some example embodiments, the differential disconnect system has an actuation arm extending through the housing to axially displace the first clutch element to engage and disengage with the second clutch element. In an example embodiment, the actuation arm includes a ring portion axially fixed to the first clutch element and a plurality of axial protrusions extending through respective openings in the housing. In an example embodiment, the differential disconnect system has a shift sleeve arranged for displacement by a shift fork to displace the actuation arm.

In some example embodiments, the differential unit includes a differential housing and the second clutch element is fixed to the differential housing. In some example embodiments, the differential disconnect system has a first radial bearing supporting the differential housing in the housing. In an example embodiment, the differential disconnect includes a second radial bearing supporting the differential housing in the housing.

In an example embodiment, the housing includes a first housing half with a first tubular protrusion extending away from the differential unit in a first axial direction and a second housing half with a second tubular protrusion extending away from the differential unit in a second axial direction, opposite the first axial direction. In an example embodiment, the differential unit includes a pair of side gears with inner splines for driving engagement with the pair of axle shafts, a shaft, and a pair of spider gears, rotatable on the shaft and each meshed with both of the pair of side gears.

In some example embodiments, the differential disconnect system includes a final drive gear. The housing includes radially outwardly facing teeth and the final drive gear comprises radially inwardly facing teeth drivingly engaged with the radially outwardly facing teeth. In an example embodiment, the housing radially inwardly facing teeth and the housing radially outwardly facing teeth form an undulating cylindrical portion of the housing. In an example embodiment, the final drive gear is bolted to the housing. In some example embodiments, the housing has a first housing half with a radial flange bolted to the final drive gear and a plurality of apertures, and a second housing half with a plurality of axial tabs extending through the plurality of apertures. In an example embodiment, the plurality of axial tabs are axially fixed in the first housing half when the radial flange is bolted to the final drive gear.

In an example embodiment, the differential disconnect system includes a final drive gear. The housing includes a first housing half with a radial flange bolted to the final drive gear and a second housing half fixed to the final drive gear by welding.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
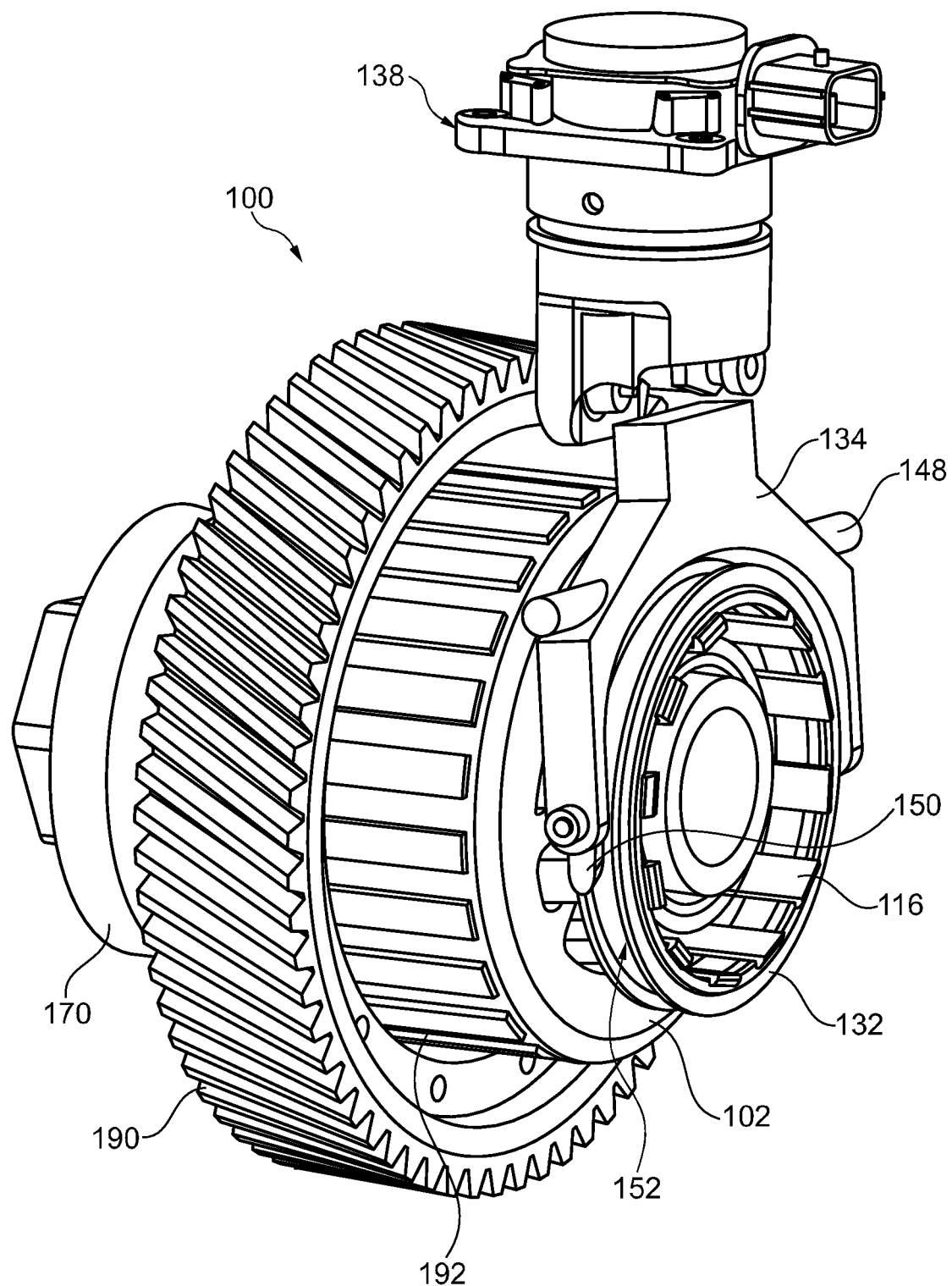
FIG. 1 illustrates a perspective view of a differential disconnect system, according to a first example embodiment.
Figure 2:
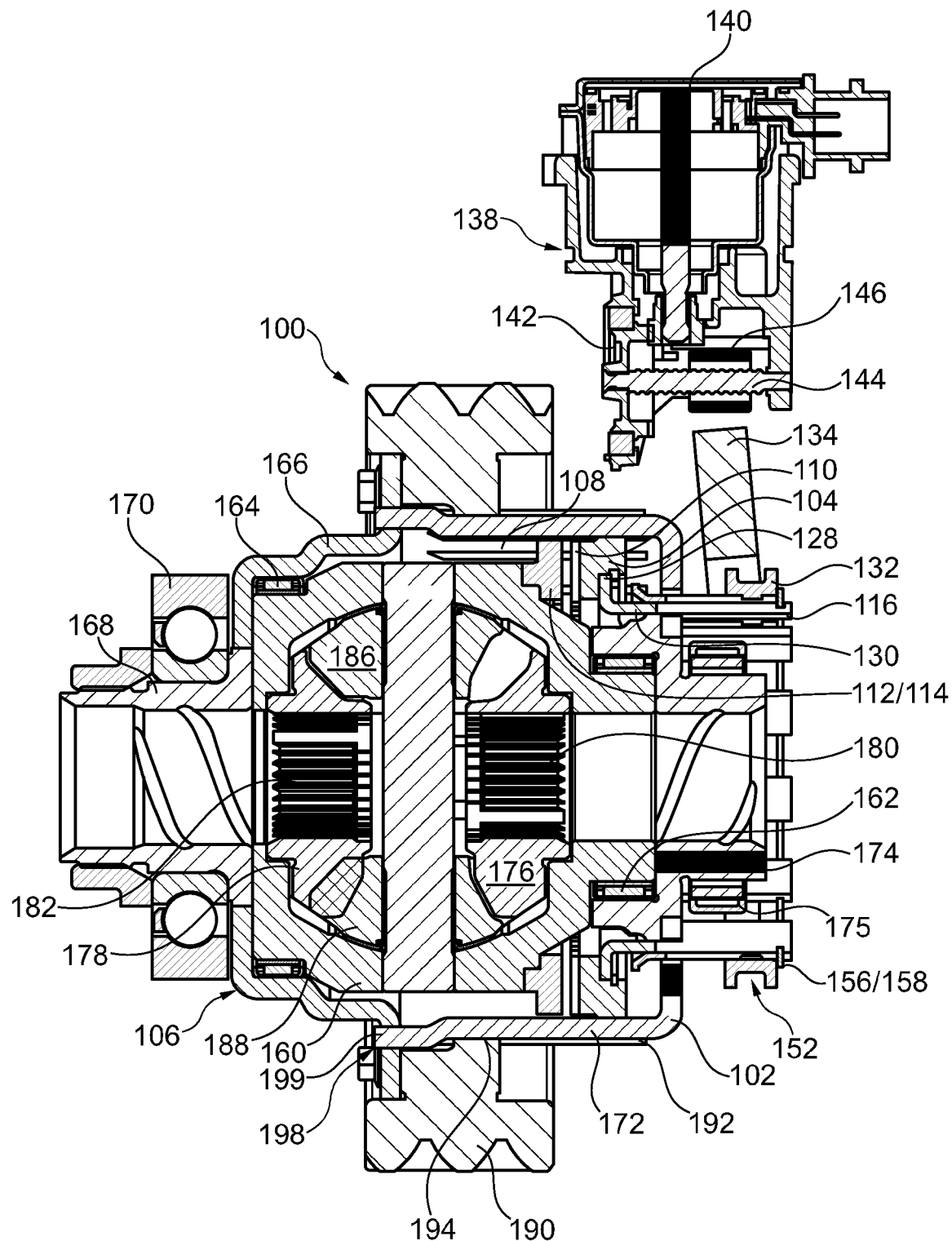
FIG. 2 illustrates a cross-sectional view of the differential disconnect system of FIG. 1.
Figure 4:
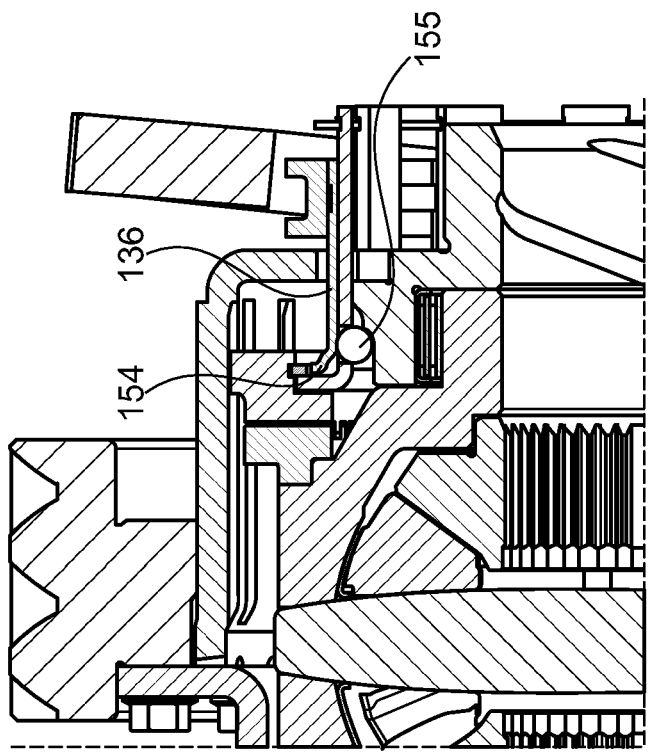
FIG. 4 illustrates a detail cross-sectional view of the differential disconnect system of FIG. 1 shown in an engaged position.
Figure 3:
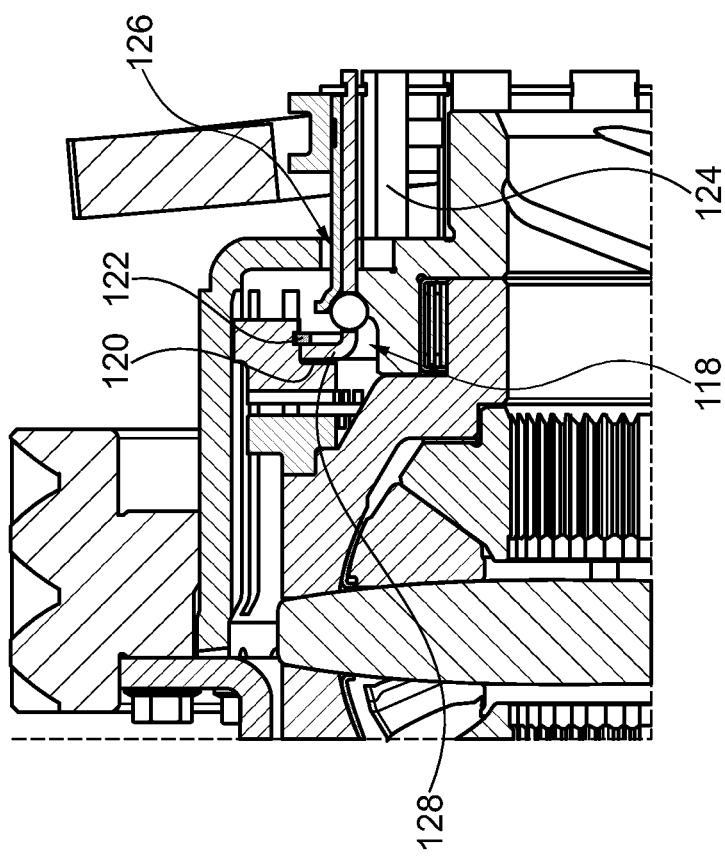
FIG. 3 illustrates a detail cross-sectional view of the differential disconnect system of FIG. 1 shown in a disconnected position.
Figure 5:
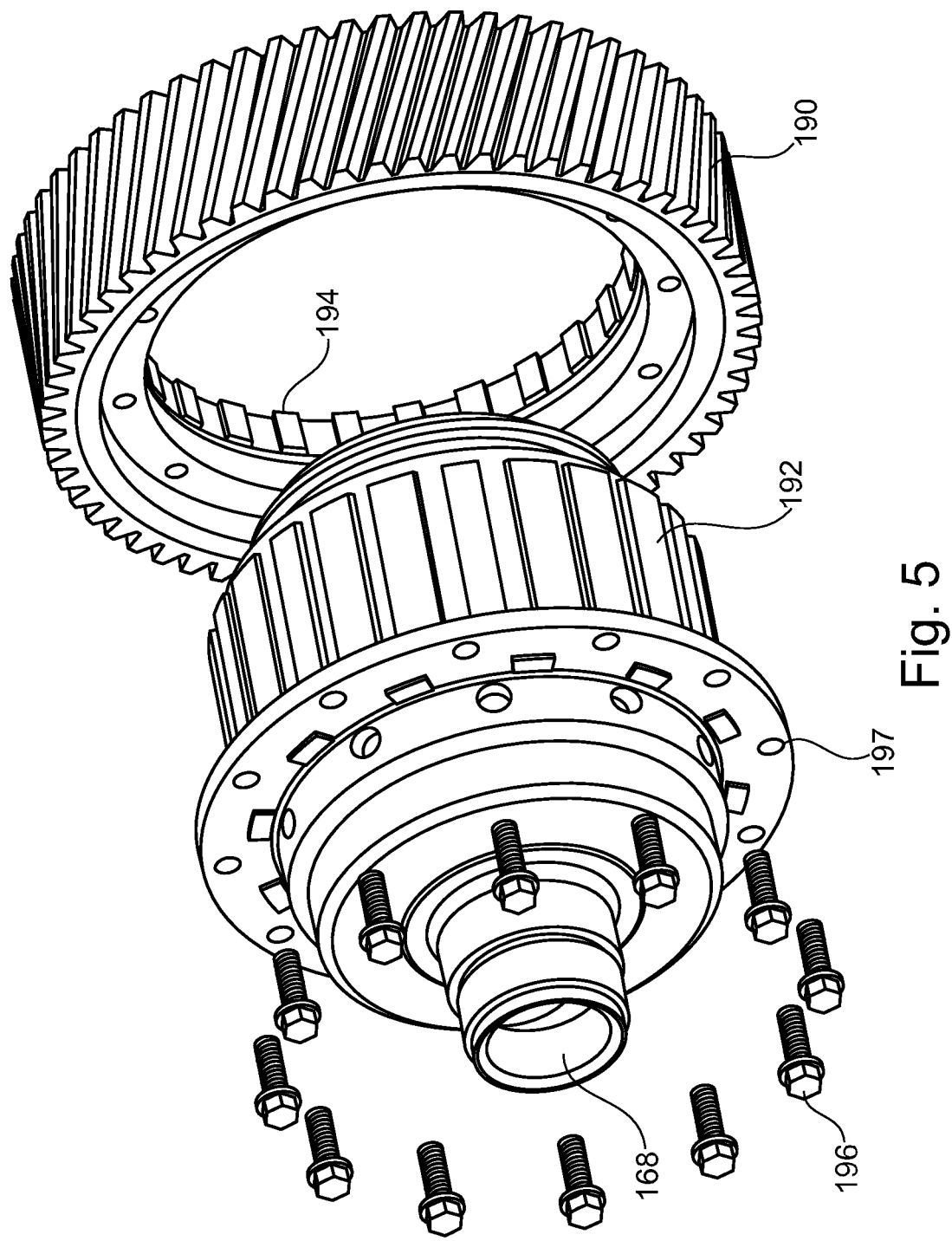
FIG. 5 illustrates a perspective partial exploded view of the differential disconnect system of FIG. 1.

The following description is made with reference to FIGS. 1-5. FIG. 1 illustrates a perspective view of differential disconnect system 100. FIG. 2 illustrates a cross-sectional view of the differential disconnect system of FIG. 1. FIG. 3 illustrates a detail cross-sectional view of the differential disconnect system of FIG. 1 shown in a disconnected position. FIG. 4 illustrates a detail cross-sectional view of the differential disconnect system of FIG. 1 shown in an engaged position. FIG. 5 illustrates a perspective partial exploded view of the differential disconnect system of FIG. 1.

Differential disconnect system 100 may be arranged in a vehicle. For example, on some electric vehicles, it may be desirable to disconnect an axle from an electric motor to avoid rotational losses through gears and/or the motor. System 100 allows free rotation of vehicle axle shafts without rotation of a final drive gear or an electric motor for improved efficiency. As will be discussed below, the differential disconnect system may be engaged and disengaged by an electric actuator to connect and disconnect the drive gear and motor to the axle shafts.

Differential disconnect system 100 includes housing 102 arranged to receive a motor torque (e.g., from an electric motor, not shown), clutch element 104 and differential unit 106 arranged for driving engagement with a pair of axle shafts (not shown). Housing 102 includes radially inwardly facing teeth 108 and clutch element 104 is drivingly engaged with and axially slidable on the radially inwardly facing teeth. Clutch element 104 includes face spline 110 and differential unit 106 includes clutch element 112 with face spline 114 arranged to engage face spline 110 for selective torque transmission between the housing and the differential unit. In other words, when the face splines are engaged, torque (e.g., motor torque) is transmitted from the housing to the differential unit and road torque (e.g., from the axle shafts) is transmitted from the differential unit to the housing. By face splines, we mean a complementary set of radially-extending teeth that can be engaged for torque transmission when the two splines are axially pressed together. An example face spline is shown and described in commonly-assigned U.S. Pat. No. 8,444,322 titled FACE SPLINE FOR A DRIVEN WHEEL HUB to Langer et al., hereby incorporated by reference as if set forth fully herein. Although the above reference shows angled teeth, face splines 110 and 114 may be any axially engaged set of radially extending teeth (e.g., flat-sided teeth as shown in the Figures).

Differential disconnect system 100 includes actuation arm 116 extending through the housing to axially displace clutch element 104 to engage and disengage with clutch element 112. Actuation arm 116 includes ring portion 118 axially fixed to clutch element 104 between radial wall 120 of clutch element 104 and snap ring 122, for example, and axial protrusions 124 extending through respective openings 126 in the housing. Ring portion 118 includes annular portion 128 and cylindrical portion 130, and protrusions 124 extend from the cylindrical portion. Shift sleeve 132 is arranged for displacement by shift fork 134 (via shift ring 136) to displace the actuation arm. That is, electric actuator 138 includes electric motor 140 that operates gear train 142 to rotate ball screw 144. Ball nut 146 is engaged with ball screw 144 and is axially displaced when the ball screw rotates, pivoting the shift fork about pins 148. Pivotable tabs 150 are disposed in groove 152 of sleeve 132 to axially displace the sleeve. Sleeve 132 is engaged with shift ring 136 so that displacement of the sleeve displaces the ring. Ring 136 includes distal end 154 arranged to contact annular portion 128 to engage the face splines. Detent ball 155 is radially displaced by ring 136 to maintain axial position of actuation arm 116 without additional forces pushing the face clutch together. Snap ring 156, disposed in grooves 158 of protrusions 124, pulls the actuation arm (and clutch element 104) to disengage the face splines when the electric actuator is reversed.

Differential unit 106 includes differential housing 160 and clutch element 112 is fixed to the differential housing by welding, for example. Although the specification specifically recites welding, other methods of fixing components together could be employed throughout. For example, adhesives, brazing, mechanical deformation (e.g., staking) or other known methods may be used to fix various components together. Differential disconnect system 100 also includes radial bearings 162 and 164 supporting differential housing 160 in housing 102. Differential housing 160 includes housing half 166 with tubular protrusion 168, supported by bearing 170 and extending away from the differential unit, and housing half 172 with tubular protrusion 174, supported by bearing 175 and extending away from the differential unit. Bearings 170 and 175 are arranged to support the differential unit in an axle housing (not shown), for example. Differential unit 106 also includes side gears 176 and 178 with inner splines 180 and 182, respectively, for driving engagement with the pair of axle shafts (not shown), shaft 184, and spider gears 186 and 188, rotatable on the shaft and each meshed with both of side gears 176 and 178.

Differential disconnect system 100 also includes final drive gear 190. Housing 102 includes radially outwardly facing teeth 192 and final drive gear 190 includes radially inwardly facing teeth 194 drivingly engaged with the radially outwardly facing teeth. Radially inwardly facing teeth 108 and radially outwardly facing teeth 192 form an undulating cylindrical portion of the housing. That is, the housing is formed such that gaps between teeth 108 form teeth 192, and vice versa, and the housing has a generally same thickness throughout the cylindrical portion. Final drive gear 190 is bolted to the housing with bolts 196, for example. Housing half 166 includes radial flange 197 bolted to final drive gear 190 (with bolts 196, for example) and apertures 198. Housing half 172 includes axial tabs 199 extending through apertures 198. Axial tabs 199 are axially fixed in housing half 166 by riveting. That is, axially distal ends of tabs 199 extending through the apertures are "upset" (e.g., physically deformed) to fix the tabs in the apertures, thereby connecting housing halves 166 and 172 together.

Figure 7:
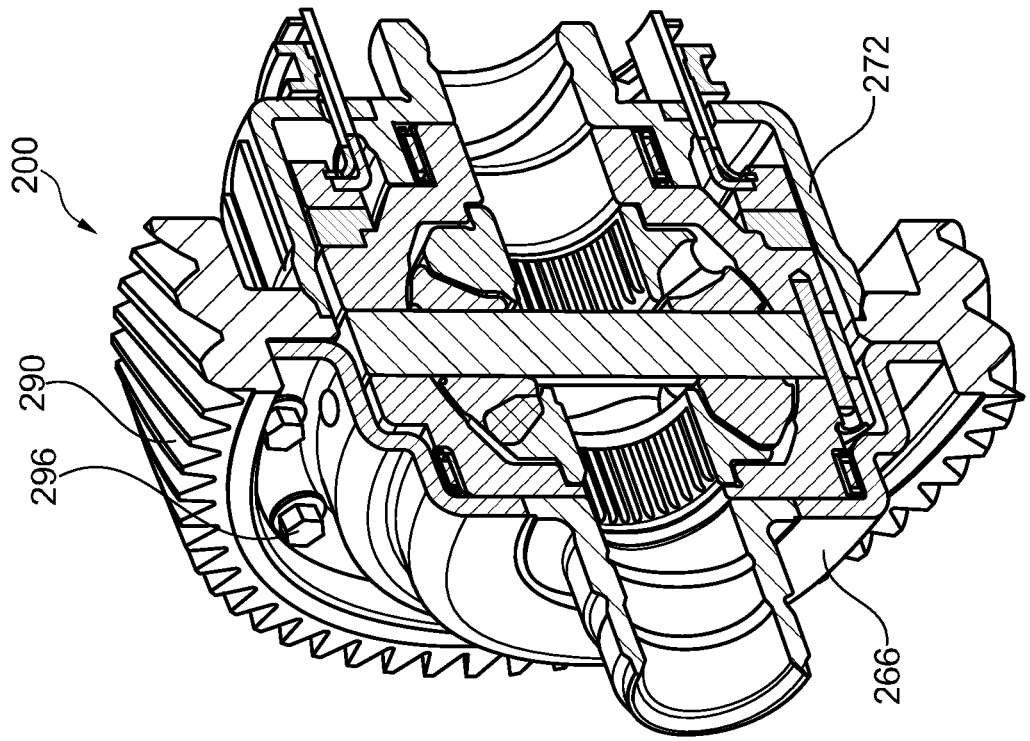
FIG. 7 illustrates a perspective cross-sectional view of the differential disconnect system of FIG. 6.
Figure 6:
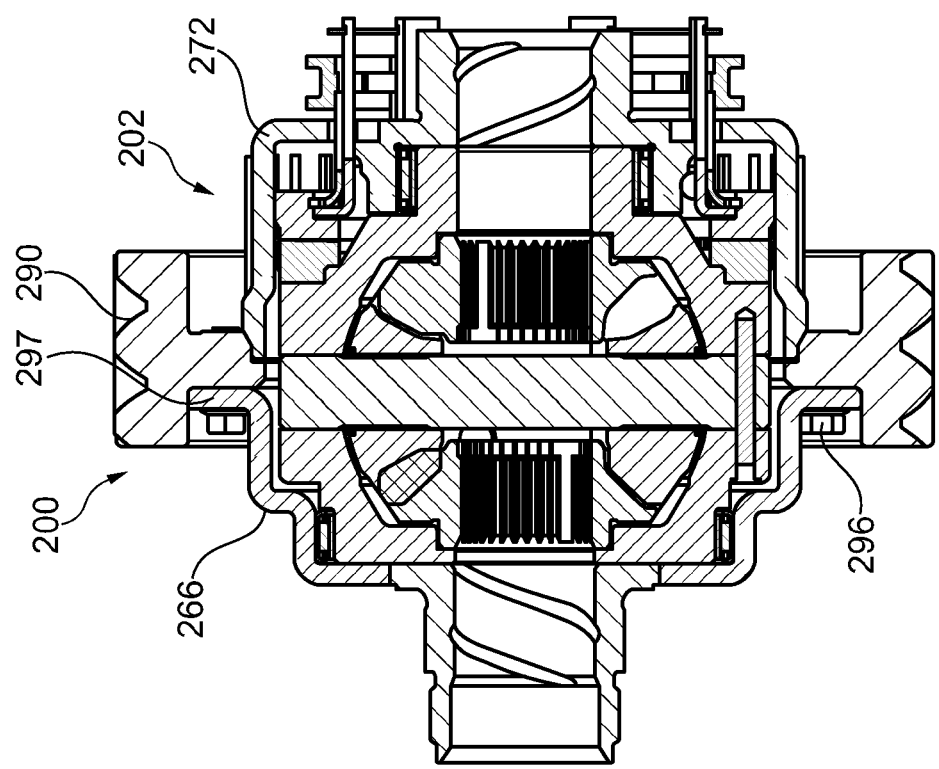
FIG. 6 illustrates a cross-sectional view of a differential disconnect system, according to a second example embodiment.
Figure 8:
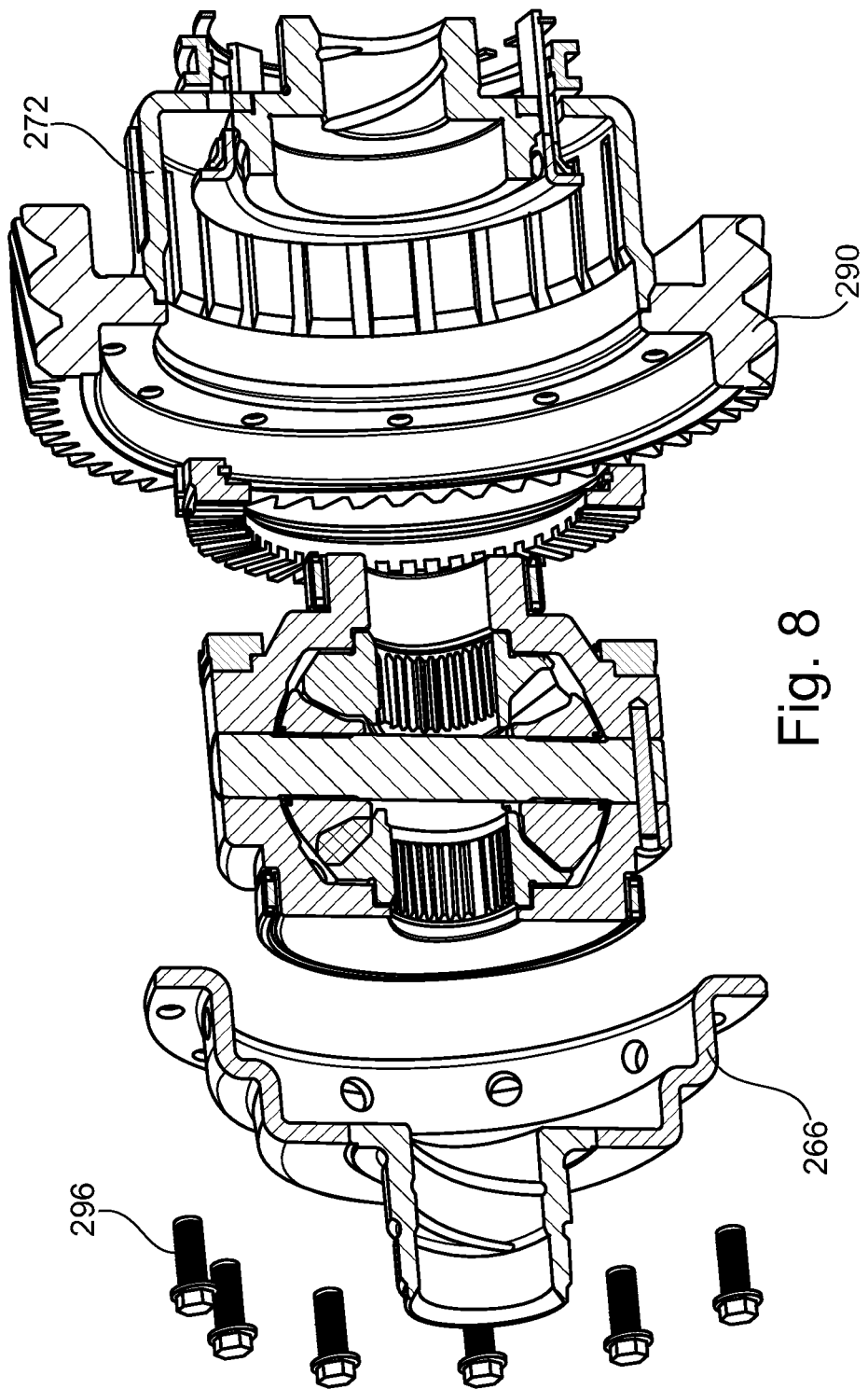
FIG. 8 illustrates a perspective cross-sectional exploded view of the differential disconnect system of FIG. 6.

The following description is made with reference to FIGS. 6-8. FIG. 6 illustrates a cross-sectional view of differential disconnect system 200. FIG. 7 illustrates a perspective cross-sectional view of the differential disconnect system of FIG. 6. FIG. 8 illustrates a perspective cross-sectional exploded view of the differential disconnect system of FIG. 6. Differential disconnect system 200 generally operates in a same manner as differential disconnect system 100 described above except as described below.

Differential disconnect system 200 includes final drive gear 290. Housing 202 includes housing half 266 with radial flange 297 bolted to the final drive gear (with bolts 296) and housing half 272 fixed to the final drive gear by welding. Contrary to differential disconnect system 100 described above, final drive gear 290 does not include radially inwardly facing teeth but is instead drivingly engaged with housing 202 by welding of housing half 272. In this case, the welded final drive gear and housing half 272 are provided as a subassembly prior to final assembly of the differential disconnect system. Once the components (e.g., differential unit 206) are installed in housing half 272, housing half 266 is bolted to the final drive gear.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Differential disconnect system
102 Housing
104 Clutch element (first)
106 Differential unit
108 Radially inwardly facing teeth (housing)
110 Face spline (first)
112 Clutch element (second)
114 Face spline (second)
116 Actuation arm
118 Ring portion (actuation arm)
120 Radial wall (clutch element 104)
122 Snap ring (clutch element 104)
124 Axial protrusions (actuation arm)
126 Openings (housing)
128 Annular portion (actuation arm ring portion)
130 Cylindrical portion (actuation arm ring portion)
132 Shift sleeve
134 Shift fork
136 Shift ring
138 Electric actuator
140 Electric motor
142 Gear train (electric actuator)
144 Ball screw (electric actuator)
146 Ball nut (electric actuator)
148 Pins (shift fork)
150 Pivotable tabs (shift fork)
152 Groove (shift sleeve)
154 Distal end (shift ring)
155 Detent ball
156 Snap ring (actuation arm)
158 Grooves (actuation arm axial protrusions)
160 Differential housing
162 Radial bearing (first)
164 Radial bearing (second)
166 Housing half (first)
168 Tubular protrusion (first)
170 Bearing
172 Housing half (second)
174 Tubular protrusion (second)
175 Bearing
176 Side gear
178 Side gear
180 Inner spline (side gear 176)
182 Inner spline (side gear 178)
184 Shaft
186 Spider gear
188 Spider gear
190 Final drive gear
192 Radially outwardly facing teeth (housing)
194 Radially inwardly facing teeth (final drive gear)
196 Bolts
197 Radial flange (housing half 166)
198 Apertures (housing half 166)
199 Axial tabs (housing half 172)
200 Differential disconnect system
202 Housing
266 Housing half
272 Housing half
290 Final drive gear
296 Bolts
297 Radial flange

What is claimed is:

1. A differential disconnect system for a vehicle, comprising:
   a housing arranged to receive a motor torque, the housing comprising radially inwardly facing teeth;
   a first clutch element drivingly engaged with and axially slidable on the radially inwardly facing teeth, the first clutch element comprising a first face spline;
   a differential unit arranged for driving engagement with a pair of axle shafts, the differential unit comprising:
     a differential housing; and
     a second clutch element fixed to the differential housing, the second clutch element comprising a second face spline arranged to engage the first face spline for selective torque transmission between the housing and the differential unit;
   a first radial bearing supporting relative rotation between the differential housing and the housing;
   an actuation arm extending through the housing to axially displace the first clutch element to engage and disengage with the second clutch element;
   a detent ball disposed in an aperture of the actuation arm; and
   a shift ring for axially displacing the actuation arm and radially displacing the detent ball to maintain an axial position of the actuation arm to keep the second face spline engaged with the first face spline without additional forces.

2. The differential disconnect system of claim 1 wherein the actuation arm comprises:
   a ring portion axially fixed to the first clutch element; and
   a plurality of axial protrusions extending through respective openings in the housing.

3. The differential disconnect system of claim 1 further comprising a shift sleeve arranged for displacement by a shift fork to displace the actuation arm.

4. The differential disconnect system of claim 1 further comprising a second radial bearing supporting the differential housing in the housing.

5. The differential disconnect system of claim 1 wherein the housing comprises:
   a first housing half comprising a first tubular protrusion extending away from the differential unit in a first axial direction; and
   a second housing half comprising a second tubular protrusion extending away from the differential unit in a second axial direction, opposite the first axial direction.

6. The differential disconnect system of claim 1 wherein the differential unit further comprises:
   a pair of side gears comprising inner splines for driving engagement with the pair of axle shafts;
   a shaft; and
   a pair of spider gears, rotatable on the shaft and each meshed with both of the pair of side gears.

7. The differential disconnect system of claim 1 further comprising a final drive gear, wherein:
   the housing comprises radially outwardly facing teeth; and
   the final drive gear comprises radially inwardly facing teeth drivingly engaged with the radially outwardly facing teeth.

8. The differential disconnect system of claim 7 wherein the housing radially inwardly facing teeth and the housing radially outwardly facing teeth form an undulating cylindrical portion of the housing.

9. The differential disconnect system of claim 7 wherein the final drive gear is bolted to the housing.

10. The differential disconnect system of claim 7 wherein the housing comprises:
    a first housing half comprising:
      a radial flange bolted to the final drive gear; and
      a plurality of apertures; and
    a second housing half comprising a plurality of axial tabs extending through the plurality of apertures.

11. The differential disconnect system of claim 10 wherein the plurality of axial tabs are axially fixed in the first housing half by riveting.

12. The differential disconnect system of claim 1 further comprising a final drive gear, wherein the housing comprises:
    a first housing half comprising a radial flange bolted to the final drive gear; and
    a second housing half fixed to the final drive gear by welding.

* * * * *